United States Patent
Huang et al.

(10) Patent No.: US 11,616,607 B2
(45) Date of Patent: Mar. 28, 2023

(54) PRIORITY-BASED HYBRID AUTOMATIC REPEAT REQUEST ACKNOWLEDGEMENT (HARQ-ACK) FEEDBACK

(71) Applicant: QUALCOMM Incorporated, San Diego, CA (US)

(72) Inventors: Yi Huang, San Diego, CA (US); Wei Yang, San Diego, CA (US); Ahmed Elshafie, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 196 days.

(21) Appl. No.: 17/112,244

(22) Filed: Dec. 4, 2020

(65) Prior Publication Data

US 2022/0182189 A1 Jun. 9, 2022

(51) Int. Cl.
*H04L 1/18* (2006.01)
*H04L 1/1812* (2023.01)
*H04W 72/04* (2023.01)
*H04W 72/10* (2009.01)

(52) U.S. Cl.
CPC ....... *H04L 1/1816* (2013.01); *H04W 72/0406* (2013.01); *H04W 72/10* (2013.01)

(58) Field of Classification Search
CPC ..... H04L 1/1816; H04L 1/007; H04L 1/0073; H04L 1/1858; H04L 1/1896; H04L 1/1854; H04W 72/0406; H04W 72/10
See application file for complete search history.

(56) References Cited

U.S. PATENT DOCUMENTS

| | | | |
|---|---|---|---|
| 2019/0306921 A1* | 10/2019 | Wang | H04L 5/0055 |
| 2021/0250134 A1* | 8/2021 | Islam | H04L 1/1861 |
| 2022/0039088 A1* | 2/2022 | Zhang | H04W 72/0413 |
| 2022/0116157 A1* | 4/2022 | Papasakellariou | H04L 1/1861 |
| 2022/0124698 A1* | 4/2022 | Noh | H04W 72/10 |
| 2022/0124775 A1* | 4/2022 | Zhang | H04W 72/044 |
| 2022/0132496 A1* | 4/2022 | Lu | H04W 72/042 |
| 2022/0132537 A1* | 4/2022 | Wang | H04L 5/0094 |
| 2022/0183024 A1* | 6/2022 | Andersson | H04L 1/1812 |

OTHER PUBLICATIONS

International Search Report and Written Opinion—PCT/US2021/072212—ISA/EPO—dated Feb. 10, 2022 (2101121 WO).

(Continued)

*Primary Examiner* — Pao Sinkantarakorn
*Assistant Examiner* — Kabir U Jahangir
(74) *Attorney, Agent, or Firm* — Harrity & Harrity, LLP

(57) ABSTRACT

Various aspects of the present disclosure generally relate to wireless communication. In some aspects, a user equipment (UE) may receive downlink data from a base station. The UE may transmit, to the base station via a physical uplink control channel (PUCCH) format 1 and based at least in part on the downlink data, a first hybrid automatic repeat request acknowledgement (HARQ-ACK) bit associated with a high priority using a first quantity of symbols. The UE may transmit, to the base station via the PUCCH format 1 and based at least in part on the downlink data, a second HARQ-ACK bit associated with a low priority using a second quantity of symbols that is less than the first quantity of symbols. Numerous other aspects are provided.

30 Claims, 10 Drawing Sheets

(56) References Cited

OTHER PUBLICATIONS

MCC Support: "Draft Report of 3GPP TSG RAN WG1 #102-e v0.2.0 (Online meeting, Aug. 17-28, 2020)", 3GPP Draft, DRAFT_MINUTES_REPORT_RAN1#102-E_V020, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2021-Nov. 13, 2020, Sep. 19, 2020 (Sep. 19, 2020), XP051935250, Retrieved from the Internet: URL:https://ftp.3gpp.org/tsg_ran/WG1_RL1/TSGR1_102-e/Report/Draft_Minutes_report_RAN1%23102-e_v020.zip Draft_Minutes_report_RAN1#102-e_v020.docx [retrieved on Sep. 19, 2020] Section 8.3.3, p. 125—p. 127.

Moderator (Oppo) : "Summary#1 of Email Thread [103-e-NR-IIOT_URLLC_enh-04]", 3GPP Draft, R1-2009546, 3GPP TSG RAN WG1 #102-e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Nov. 17, 2020 (Nov. 17, 2020), XP051955615, 96 Pages, Retrieved from the Internet: URL:https://ftp.3gpp.org/tsg_ran/WG1_RL1/TSGR1_103-e/Docs/R1-2009546.zip R1-2009546 Email discussion summary for R17 intra-UE MUX -final version.docx [retrieved on Nov. 17, 2020] p. 1 Section 2.3-2.3.5, p. 12-p. 50.

Wilus Inc: "Discussion on Intra-UE Multiplexing/Prioritization for URLLC/IIoT", 3GPP Draft, R1-2009248, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946912, 6 Pages, Retrieved from the Internet: URL:https://ftp.3gpp.org/tsg_ran/WG1_RL1/TSGR1_103-e/Docs/R1-2009248.zip R1-2009248_intra_mux_final.docx [retrieved on Oct. 24, 2020] Section 1, p. 1 p. 3, paragraph 1-paragraph 2 p. 4, paragraph 5-paragraph 7 p. 5, paragraph 2-paragraph 4 Section 3, p. 6 the whole document.

\* cited by examiner

US 11,616,607 B2

PRIORITY-BASED HYBRID AUTOMATIC REPEAT REQUEST ACKNOWLEDGEMENT (HARQ-ACK) FEEDBACK

FIELD OF THE DISCLOSURE

Aspects of the present disclosure generally relate to wireless communication and to techniques and apparatuses for priority-based hybrid automatic repeat request acknowledgement (HARQ-ACK) feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes receiving downlink data from a base station; transmitting, to the base station via a physical uplink control channel (PUCCH) format 1 and based at least in part on the downlink data, a first HARQ-ACK bit associated with a high priority using a first quantity of symbols; and transmitting, to the base station via the PUCCH format 1 and based at least in part on the downlink data, a second HARQ-ACK bit associated with a low priority using a second quantity of symbols that is less than the first quantity of symbols.

In some aspects, a method of wireless communication performed by a base station includes transmitting downlink data to a UE; receiving, from the UE via a PUCCH format 1 and based at least in part on the downlink data, a first HARQ-ACK bit associated with a high priority using a first quantity of symbols; and receiving, from the UE via the PUCCH format 1 and based at least in part on the downlink data, a second HARQ-ACK bit associated with a low priority using a second quantity of symbols that is less than the first quantity of symbols.

In some aspects, a UE for wireless communication includes a memory and one or more processors operatively coupled to the memory, the memory and the one or more processors configured to: receive downlink data from a base station; transmit, to the base station via a PUCCH format 1 and based at least in part on the downlink data, a first HARQ-ACK bit associated with a high priority using a first quantity of symbols; and transmit, to the base station via the PUCCH format 1 and based at least in part on the downlink data, a second HARQ-ACK bit associated with a low priority using a second quantity of symbols that is less than the first quantity of symbols.

In some aspects, a base station for wireless communication includes a memory and one or more processors operatively coupled to the memory, the memory and the one or more processors configured to: transmit downlink data to a UE; receive, from the UE via a PUCCH format 1 and based at least in part on the downlink data, a first HARQ-ACK bit associated with a high priority using a first quantity of symbols; and receive, from the UE via the PUCCH format 1 and based at least in part on the downlink data, a second HARQ-ACK bit associated with a low priority using a second quantity of symbols that is less than the first quantity of symbols.

In some aspects, a non-transitory computer-readable medium storing a set of instructions for wireless communication includes one or more instructions that, when executed by one or more processors of a UE, cause the UE to: receive downlink data from a base station; transmit, to the base station via a PUCCH format 1 and based at least in part on the downlink data, a first HARQ-ACK bit associated with a high priority using a first quantity of symbols; and transmit, to the base station via the PUCCH format 1 and based at least in part on the downlink data, a second HARQ-ACK bit associated with a low priority using a second quantity of symbols that is less than the first quantity of symbols.

In some aspects, a non-transitory computer-readable medium storing a set of instructions for wireless communication includes one or more instructions that, when executed by one or more processors of a base station, cause the base station to: transmit downlink data to a UE; receive, from the UE via a PUCCH format 1 and based at least in part on the downlink data, a first HARQ-ACK bit associated with a high priority using a first quantity of symbols; and receive, from the UE via the PUCCH format 1 and based at least in part on the downlink data, a second HARQ-ACK bit associated with a low priority using a second quantity of symbols that is less than the first quantity of symbols.

In some aspects, an apparatus for wireless communication includes means for receiving downlink data from a base station; means for transmitting, to the base station via a PUCCH format 1 and based at least in part on the downlink data, a first HARQ-ACK bit associated with a high priority using a first quantity of symbols; and means for transmitting, to the base station via the PUCCH format 1 and based at least in part on the downlink data, a second HARQ-ACK bit associated with a low priority using a second quantity of symbols that is less than the first quantity of symbols.

In some aspects, an apparatus for wireless communication includes means for transmitting downlink data to a UE; means for receiving, from the UE via a PUCCH format 1 and based at least in part on the downlink data, a first HARQ-ACK bit associated with a high priority using a first quantity of symbols; and means for receiving, from the UE via the PUCCH format 1 and based at least in part on the downlink data, a second HARQ-ACK bit associated with a low priority using a second quantity of symbols that is less than the first quantity of symbols.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
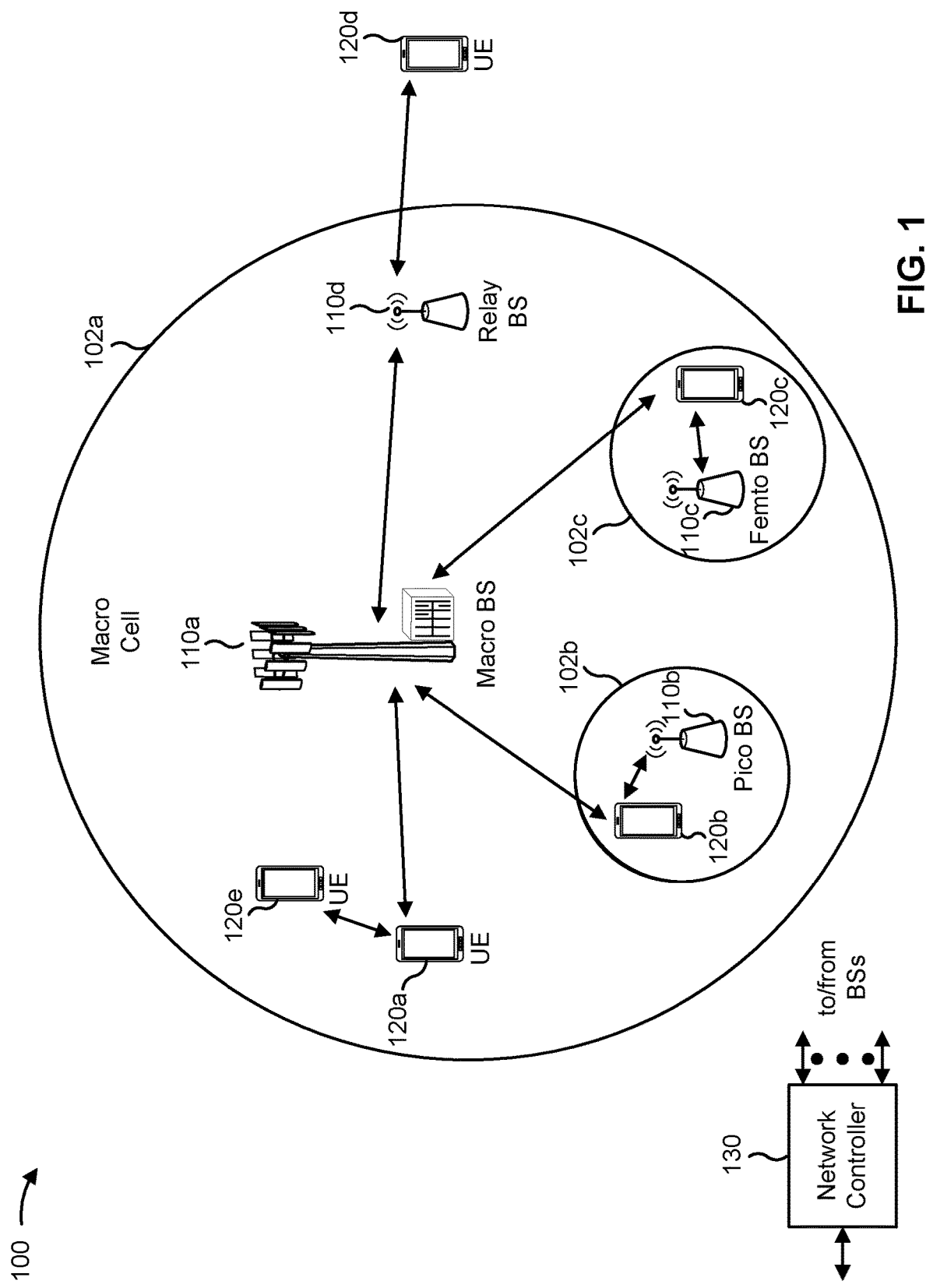
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
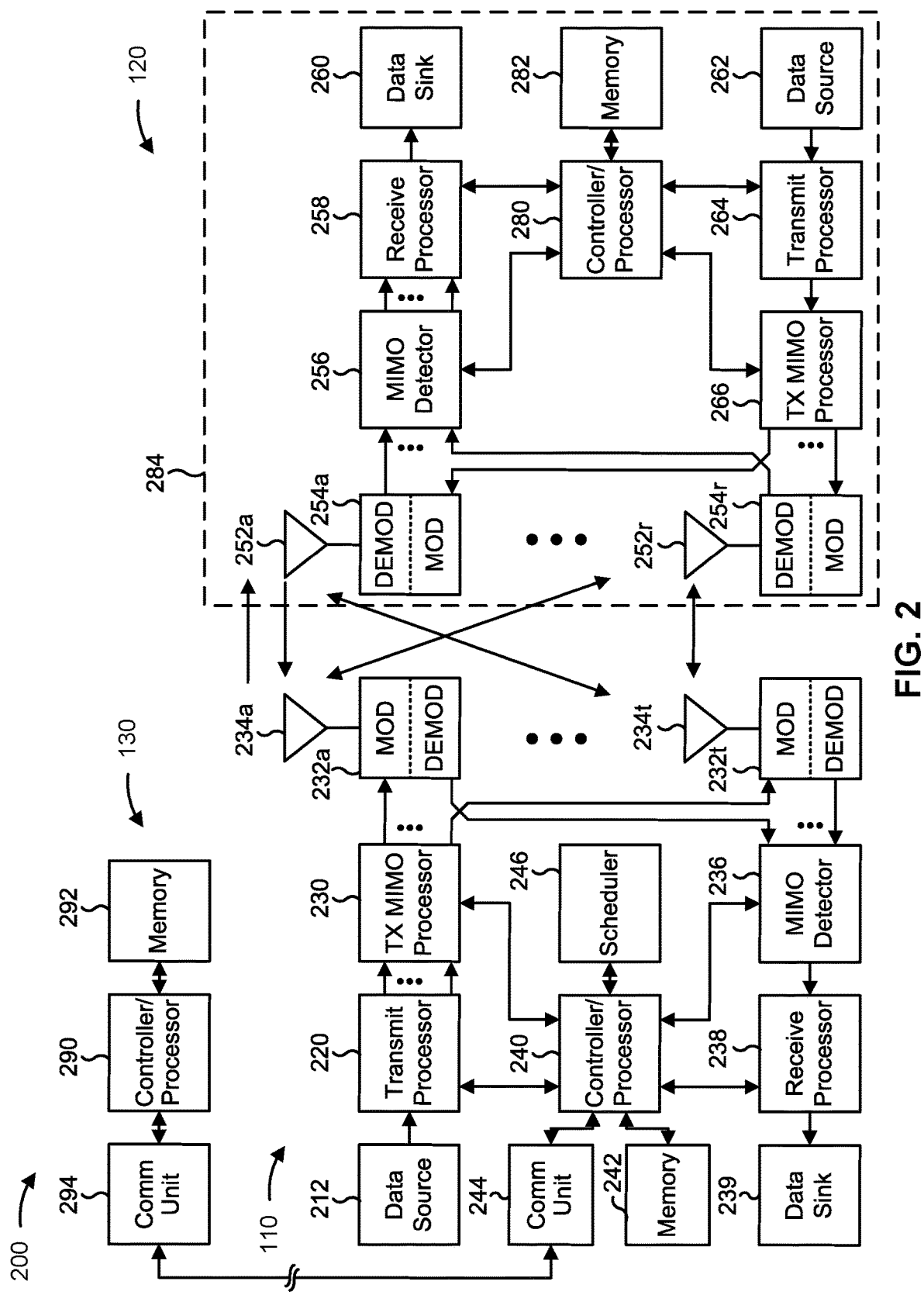
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-8.

Controller/processor 240 of base station 110, controller/processor 280 of UE 120, and/or any other component(s) of FIG. 2 may perform one or more techniques associated with priority-based HARQ-ACK feedback, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a UE (e.g., UE 120) includes means for receiving downlink data from a base station; means for transmitting, to the base station via a PUCCH format 1 and based at least in part on the downlink data, a first HARQ-ACK bit associated with a high priority using a first quantity of symbols; and/or means for transmitting, to the base station via the PUCCH format 1 and based at least in part on the downlink data, a second HARQ-ACK bit associated with a low priority using a second quantity of symbols that is less than the first quantity of symbols. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting HARQ-ACK feedback via the PUCCH format 1 based at least in part on a time division multiplexing of the first HARQ-ACK bit and the second HARQ-ACK bit.

In some aspects, the UE includes means for transmitting a repetition of the first HARQ-ACK bit using the first quantity of symbols; and/or means for transmitting a repetition of the second HARQ-ACK bit using the second quantity of symbols, wherein a quantity of the repetition of the first HARQ-ACK bit is greater than a quantity of the repetition of the second HARQ-ACK bit to increase a reliability of the first HARQ-ACK bit in relation to the second HARQ-ACK bit.

In some aspects, the UE includes means for receiving, from the base station via a radio resource control message, a parameter that defines one or more of the first quantity of symbols and the second quantity of symbols.

In some aspects, the UE includes means for receiving, from the base station via downlink control information, a parameter that defines one or more of the first quantity of symbols and the second quantity of symbols.

In some aspects, the UE includes means for transmitting the first HARQ-ACK bit earlier in time as compared to the second HARQ-ACK bit, and the first quantity of symbols occurs earlier in time as compared to the second quantity of symbols.

In some aspects, the UE includes means for transmitting, to the base station via the PUCCH format 1 and based at least in part on the downlink data, both the first HARQ-ACK bit associated with the high priority and the second HARQ-ACK bit associated with the low priority using the second quantity of symbols.

In some aspects, the UE includes means for transmitting the first HARQ-ACK bit using the first quantity of symbols associated with a first frequency band; means for transmitting the first HARQ-ACK bit using a third quantity of symbols associated with a second frequency band; means for transmitting the second HARQ-ACK bit using the second quantity of symbols associated with the first frequency band; and/or means for transmitting the second HARQ-ACK bit using a fourth quantity of symbols associated with the second frequency band, wherein the fourth quantity of symbols is less than the third quantity of symbols.

In some aspects, the UE includes means for transmitting the first HARQ-ACK bit using the first quantity of symbols associated with a first frequency band; means for transmitting the first HARQ-ACK bit using a third quantity of symbols and transmitting the first HARQ-ACK bit using a fourth quantity of symbols, wherein the third quantity of symbols and the fourth quantity of symbols are associated with a second frequency band, and wherein the fourth quantity of symbols is less than the third quantity of symbols; and/or means for transmitting the second HARQ-ACK bit using the second quantity of symbols associated with the first frequency band and transmitting the second HARQ-ACK bit using the fourth quantity of symbols associated with the second frequency band.

In some aspects, a base station (e.g., base station 110) includes means for transmitting downlink data to a UE; means for receiving, from the UE via a PUCCH format 1 and based at least in part on the downlink data, a first HARQ-ACK bit associated with a high priority using a first quantity of symbols; and/or means for receiving, from the UE via the PUCCH format 1 and based at least in part on the downlink data, a second HARQ-ACK bit associated with a low priority using a second quantity of symbols that is less than the first quantity of symbols. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for receiving HARQ-ACK feedback via the PUCCH format 1 based at least in part on a time division multiplexing of the first HARQ-ACK bit and the second HARQ-ACK bit.

In some aspects, the base station includes means for receiving a repetition of the first HARQ-ACK bit using the first quantity of symbols; and/or means for receiving a repetition of the second HARQ-ACK bit using the second quantity of symbols, wherein a quantity of the repetition of the first HARQ-ACK bit is greater than a quantity of the repetition of the second HARQ-ACK bit to increase a reliability of the first HARQ-ACK bit in relation to the second HARQ-ACK bit.

In some aspects, the base station includes means for transmitting, to the UE via a radio resource control message, a parameter that defines one or more of the first quantity of symbols and the second quantity of symbols.

In some aspects, the base station includes means for transmitting, to the UE via downlink control information, a parameter that defines one or more of the first quantity of symbols and the second quantity of symbols.

In some aspects, the base station includes means for receiving the first HARQ-ACK bit earlier in time as compared to the second HARQ-ACK bit, and the first quantity of symbols occurs earlier in time as compared to the second quantity of symbols.

In some aspects, the base station includes means for receiving, from the UE via the PUCCH format 1 and based at least in part on the downlink data, both the first HARQ-ACK bit associated with the high priority and the second HARQ-ACK bit associated with the low priority using the second quantity of symbols.

In some aspects, the base station includes means for receiving the first HARQ-ACK bit using the first quantity of symbols associated with a first frequency band; means for receiving the first HARQ-ACK bit using a third quantity of symbols associated with a second frequency band; means for receiving the second HARQ-ACK bit using the second quantity of symbols associated with the first frequency band; and/or means for receiving the second HARQ-ACK bit using a fourth quantity of symbols associated with the second frequency band, wherein the fourth quantity of symbols is less than the third quantity of symbols.

In some aspects, the base station includes means for receiving the first HARQ-ACK bit using the first quantity of symbols and receiving the first HARQ-ACK bit using the second quantity of symbols, wherein the first quantity of symbols and the second quantity of symbols are associated with a first frequency band; means for receiving the first HARQ-ACK bit using a third quantity of symbols and receiving the first HARQ-ACK bit using a fourth quantity of symbols, wherein the third quantity of symbols and the fourth quantity of symbols are associated with a second frequency band, and wherein the fourth quantity of symbols is less than the third quantity of symbols; and/or means for receiving the second HARQ-ACK bit using the second quantity of symbols associated with the first frequency band and receiving the second HARQ-ACK bit using the fourth quantity of symbols associated with the second frequency band.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
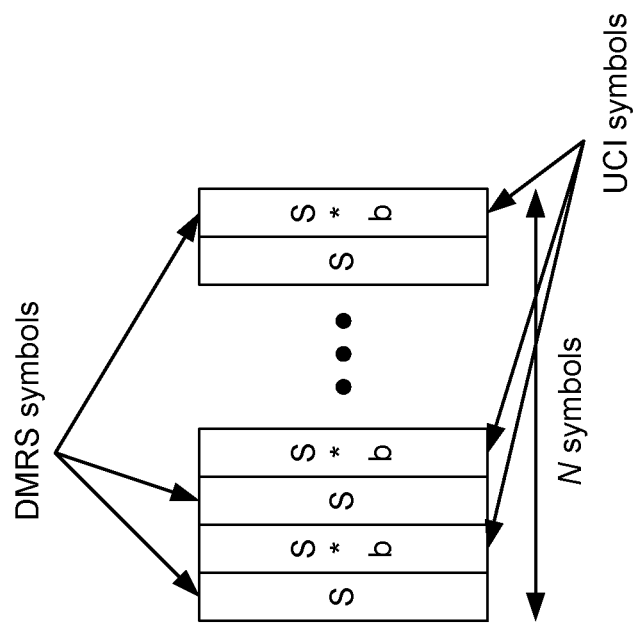
FIG. 3 is a diagram illustrating an example of HARQ-ACK feedback, in accordance with various aspects of the present disclosure.

FIG. 3 is a diagram illustrating an example 300 of HARQ-ACK feedback, in accordance with various aspects of the present disclosure.

As shown in FIG. 3, a UE may transmit, to a base station, a payload carrying uplink control information (UCI) via a PUCCH format 1. The UCI may be HARQ-ACK feedback. The payload may include one HARQ-ACK bit or two HARQ-ACK bits. The payload may range from 4 to 14 symbols (e.g., OFDM symbols). The UE may transmit the payload for a given cell-specific sequence (e.g., a sequence with a length of 12 symbols). The UE may transmit the sequence as a DMRS on even symbols in a plurality of symbols (e.g., N symbols). The UE may transmit the sequence modulated by the payload on odd symbols in the plurality of symbols. In other words, the odd symbols in the plurality of symbols may correspond to the UCI, such as the HARQ-ACK feedback, which may include the one HARQ-ACK bit or the two HARQ-ACK bits.

The UE may use binary phase-shift keying (BPSK) modulation when the payload is one bit. With a one-bit payload, generated waveforms for the two hypotheses {0} and {1} are orthogonal. The UE may use quadrature phase shift keying (QPSK) modulation when the payload is two bits. With a two-bit payload, generated waveforms for the four hypotheses {0,0}, {0,1}, {1,0}, and {1,1} are not orthogonal.

As indicated above, FIG. 3 is provided as an example. Other examples may differ from what is described with regard to FIG. 3.

A UE may transmit, to a base station, HARQ-ACK feedback including one or two HARQ-ACK bits of a same priority using PUCCH format 1. For example, the UE may transmit a payload containing the HARQ-ACK feedback using PUCCH format 1. The payload may be associated with odd symbols in a plurality of symbols. When the payload includes two HARQ-ACK bits, a first HARQ-ACK bit may have a same reliability as a second HARQ-ACK bit, as the entire payload may be associated with the odd symbols in the plurality of symbols. In other words, both HARQ-ACK bits may be modulated on each of the odd symbols, such that the first HARQ-ACK bit has no difference in terms of reliability and/or latency in relation to the second HARQ-ACK bit. However, this approach does not apply to HARQ-ACK feedback that carries two HARQ-ACK bits of unequal priority. HARQ-ACK feedback may include a first HARQ-ACK bit associated with a high priority and a second HARQ-ACK bit associated with a low priority. If the entire payload (e.g., the two HARQ-ACK bits of unequal priority) were to be associated with each odd symbol in the plurality of symbols, the first HARQ-ACK bit associated with the high priority may improperly have a same priority as the second HARQ-ACK bit associated with the low priority. In other words, the first HARQ-ACK bit associated with the high priority would not actually have a higher priority than the second HARQ-ACK bit associated with the low priority.

In various aspects of techniques and apparatuses described herein, a UE may transmit, to a base station via a PUCCH format 1, a first HARQ-ACK bit associated with a high priority using a first quantity of symbols. The UE may transmit, to the base station via the PUCCH format 1, a second HARQ-ACK bit associated with a low priority using a second quantity of symbols that is less than the first quantity of symbols. In some aspects, the UE may transmit the first HARQ-ACK bit and the second HARQ-ACK bit based at least in part on a time division multiplexing of the first HARQ-ACK bit and the second HARQ-ACK bit.

In various aspects of techniques and apparatuses described herein, the UE may transmit the first HARQ-ACK bit by transmitting a repetition of the first HARQ-ACK bit using the first quantity of symbols, and the UE may transmit the second HARQ-ACK bit by transmitting a repetition of the second HARQ-ACK bit using the second quantity of symbols. A quantity of the repetition of the first HARQ-ACK bit may be greater than a quantity of the repetition of the second HARQ-ACK bit to increase a reliability of the first HARQ-ACK bit in relation to the second HARQ-ACK bit.

In various aspects of techniques and apparatuses described herein, the UE may receive, from the base station via a radio resource control (RRC) message or downlink control information (DCI), a parameter that defines the first quantity of symbols and/or the second quantity of symbols. In some aspects, the UE may transmit the first HARQ-ACK bit earlier in time as compared to the second HARQ-ACK bit, and the first quantity of symbols may occur earlier in time as compared to the second quantity of symbols, which may reduce a latency of the first HARQ-ACK bit in relation to the second HARQ-ACK bit.

Figure 4:
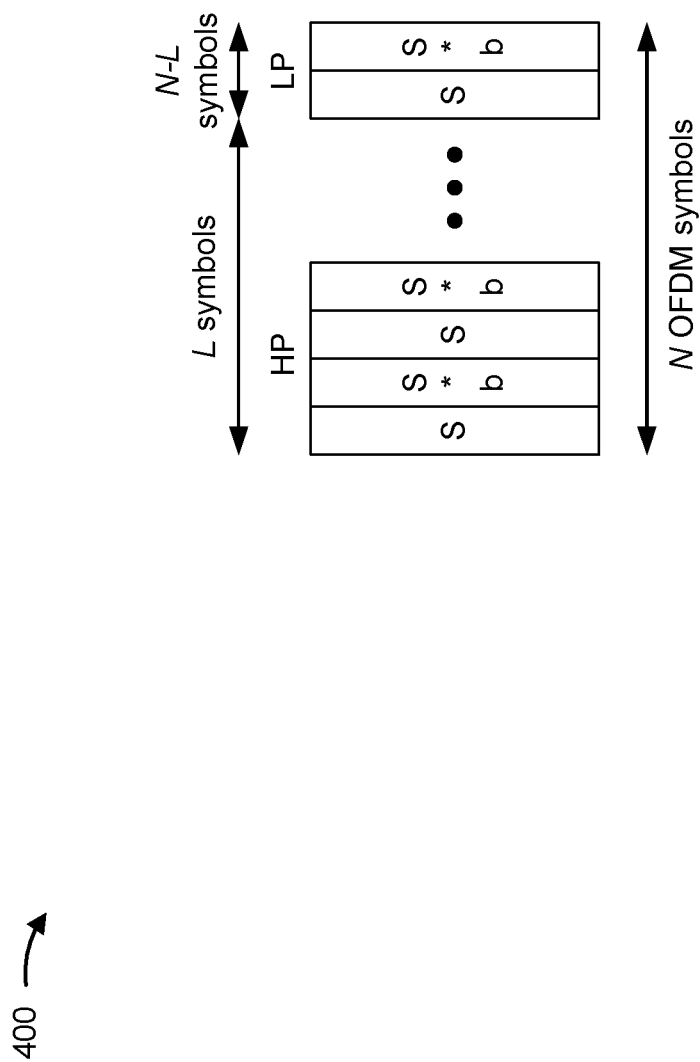
FIGS. 4-6 are diagrams illustrating examples associated with priority-based HARQ-ACK feedback, in accordance with various aspects of the present disclosure.

FIG. 4 is a diagram illustrating an example 400 associated with priority-based HARQ-ACK feedback, in accordance with various aspects of the present disclosure.

A UE (e.g., UE 120) may transmit, to a base station (e.g., base station 110), HARQ-ACK feedback via a PUCCH format 1. The HARQ-ACK feedback may include two HARQ-ACK bits. The two HARQ-ACK bits may include a first HARQ-ACK bit associated with a high priority (HP) and a second HARQ-ACK bit associated with a low priority (LP). The UE may transmit the first HARQ-ACK bit and the second HARQ-ACK bit by time division multiplexing the first HARQ-ACK bit and the second HARQ-ACK bit, which may result in an unequal reliability and/or latency between the first HARQ-ACK bit and the second HARQ-ACK bit.

As shown in FIG. 4, the UE may transmit the HARQ-ACK feedback using N symbols via the PUCCH format 1, where L symbols of the N symbols (L<N) may be associated with the first HARQ-ACK bit (b1) and N-L symbols may be associated with the second HARQ-ACK bit (b2). The L symbols may correspond to a first quantity of symbols and the N-L symbols may correspond to a second quantity of symbols. The UE may transmit the HARQ-ACK feedback for a given cell-specific sequence (e.g., a sequence with a length of 12 symbols). The UE may transmit the sequence as a DMRS on even symbols of the L symbols. The UE may transmit the sequence modulated by the first HARQ-ACK bit on odd symbols of the L symbols. In other words, the odd symbols of the L symbols may correspond to the first HARQ-ACK bit. The UE may transmit the sequence as a DMRS on even symbols of the N-L symbols. The UE may transmit the sequence modulated by the second HARQ-ACK bit on odd symbols of the N-L symbols. In other words, the odd symbols of the N-L symbols may correspond to the second HARQ-ACK bit.

In some aspects, the UE may transmit a repetition of the first HARQ-ACK bit using the L symbols, and the UE may transmit a repetition of the second HARQ-ACK bit using the N-L symbols. A quantity of the repetition of the first HARQ-ACK bit may be greater than a quantity of the repetition of the second HARQ-ACK bit, to increase a reliability of the first HARQ-ACK bit in relation to the second HARQ-ACK bit. In other words, the first HARQ-ACK bit may be repeated more times than the second HARQ-ACK bit, which may increase the reliability of the first HARQ-ACK bit in relation to the second HARQ-ACK bit. Since the first HARQ-ACK bit is associated with the high priority and the second HARQ-ACK bit is associated with the low priority, the base station may benefit from receiving more repetitions of the first HARQ-ACK bit as compared to the second HARQ-ACK bit.

In some aspects, the UE may transmit the first HARQ-ACK bit earlier in time as compared to the second HARQ-ACK bit, since the L symbols occur earlier in time as compared to the N-L symbols. As a result, a latency associated with the first HARQ-ACK bit may be different than a latency associated with the second HARQ-ACK bit, since the base station may receive and decode the first HARQ-ACK bit earlier in time as compared to the second HARQ-ACK bit. Since the first HARQ-ACK bit is associated with the high priority and the second HARQ-ACK bit is associated with the low priority, the base station may benefit from receiving the first HARQ-ACK bit prior to the second HARQ-ACK bit.

In some aspects, the UE may receive, from the base station, a parameter that defines the first quantity of symbols (L) and/or the second quantity of symbols (N-L). The UE may receive the parameter from the base station via an RRC message or DCI. In some aspects, the base station may adjust L and/or N-L, such that the base station may balance receiving the first HARQ-ACK bit earlier in time than the second HARQ-ACK bit versus increasing a reliability of the first HARQ-ACK bit in relation to the second HARQ-ACK bit.

In some aspects, the UE may transmit the first HARQ-ACK bit using the PUCCH format 1 and transmit the second HARQ-ACK bit using the PUCCH format 1. In some aspects, the UE may transmit the first HARQ-ACK bit using the PUCCH format 1 and transmit the second HARQ-ACK bit using the PUCCH format 0. For example, when N-L (the number of symbols associated with the second HARQ-ACK bit) is equal to two, the UE may transmit the second HARQ-ACK bit using the PUCCH format 0, or the UE may transmit the second HARQ-ACK bit using a special PUCCH format 1 with two symbols. As another example, when N-L is equal to one, the UE may transmit the second HARQ-ACK bit using the PUCCH format 0.

In some aspects, for two HARQ-ACK bits, generated waveforms for the four hypotheses $\{0,0\}$, $\{0,1\}$, $\{1,0\}$, and $\{1,1\}$ are orthogonal since the two hypotheses $\{0\}$ and $\{1\}$ for each of the first HARQ-ACK bit and the second HARQ-ACK bit are orthogonal. In other words, generated waveforms for the two hypotheses $\{0\}$ and $\{1\}$ associated with the first HARQ-ACK bit are orthogonal, and generated waveforms for the two hypotheses $\{0\}$ and $\{1\}$ associated with the second HARQ-ACK bit are orthogonal. Thus, within the first HARQ-ACK bit associated with the high priority and the second HARQ-ACK bit associated with the low priority, the two hypotheses are orthogonal, which may result in a performance gain at the UE and/or the base station.

As indicated above, FIG. 4 is provided as an example. Other examples may differ from what is described with regard to FIG. 4.

Figure 5:
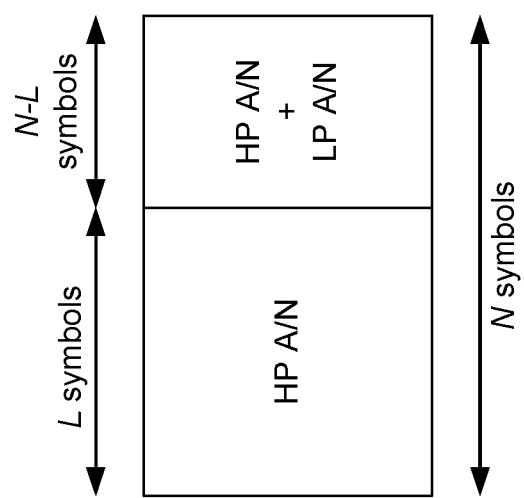

FIG. 5 is a diagram illustrating an example 500 associated with priority-based HARQ-ACK feedback, in accordance with various aspects of the present disclosure.

As shown in FIG. 5, a UE may transmit, to a base station via a PUCCH format 1, a first HARQ-ACK bit associated with a high priority using a first quantity of symbols (L symbols). The UE may transmit, to the base station via the PUCCH format 1, the first HARQ-ACK bit associated with the high priority and a second HARQ-ACK bit associated with a low priority using a second quantity of symbols (N-L symbols). The first HARQ-ACK bit transmitted using the first quantity of symbols may be one bit. The first HARQ-ACK bit transmitted using the second quantity of symbols may be one bit, and the second HARQ-ACK bit transmitted using the second quantity of symbols may be one bit.

In some aspects, the UE may transmit the first HARQ-ACK bit and the second HARQ-ACK bit via the PUCCH format 1, such that the first HARQ-ACK bit may have an unequal reliability and/or latency as compared to the second HARQ-ACK bit. For example, the UE may transmit the first HARQ-ACK bit earlier in time than the second HARQ-ACK bit to reduce the latency of the first HARQ-ACK bit in relation to the second HARQ-ACK bit. As another example, the UE may repeat the first HARQ-ACK bit using both the first quantity of symbols and the second quantity of symbols, while the second HARQ-ACK bit may be transmitted using the second quantity of symbols, which may increase the reliability of the first HARQ-ACK bit in relation to the second HARQ-ACK bit.

As indicated above, FIG. 5 is provided as an example. Other examples may differ from what is described with regard to FIG. 5.

Figure 6:
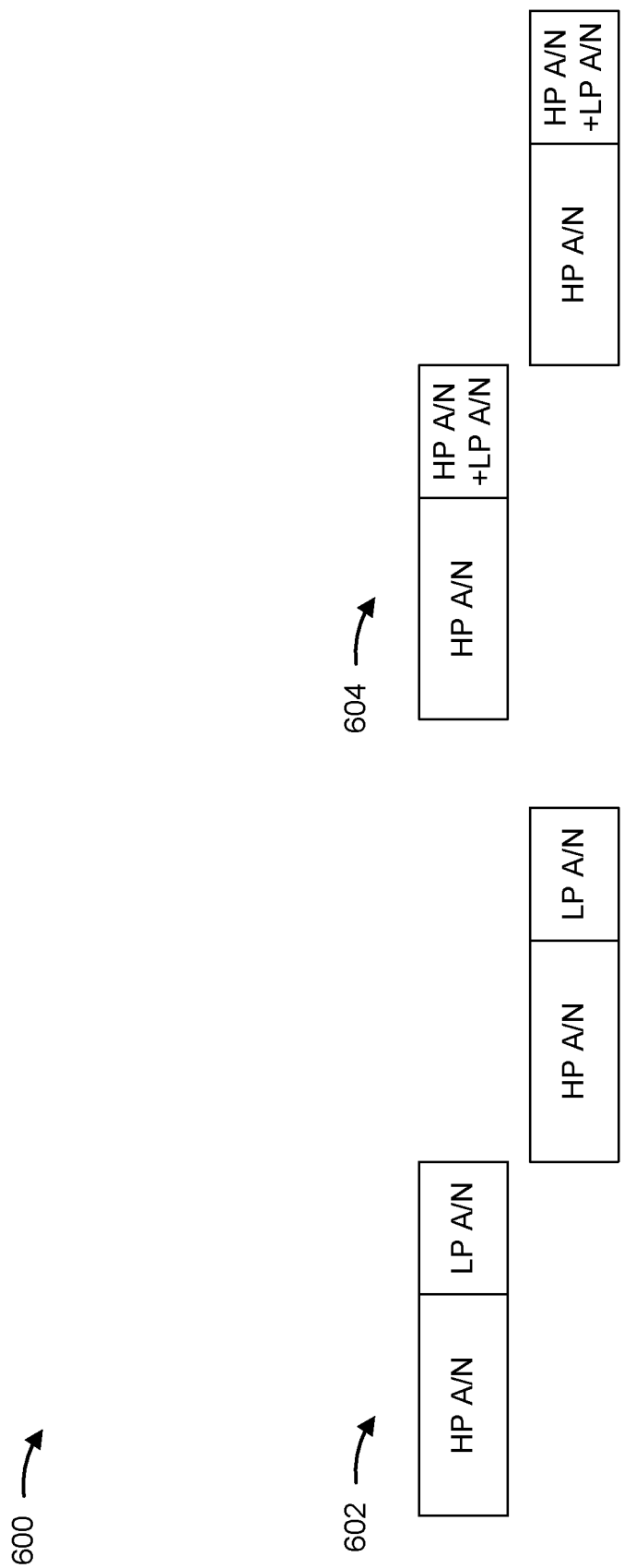

FIG. 6 is a diagram illustrating an example 600 associated with priority-based HARQ-ACK feedback, in accordance with various aspects of the present disclosure.

In some aspects, a UE may transmit, to a base station via a PUCCH format 1, a first HARQ-ACK bit associated with a high priority and a second HARQ-ACK bit associated with a low priority using frequency hopping.

As shown by reference number 602, the UE may transmit the first HARQ-ACK bit using a first quantity of symbols associated with a first frequency band. The UE may transmit the second HARQ-ACK bit using a second quantity of symbols associated with the first frequency band. Further, the UE may transmit the first HARQ-ACK bit using a third quantity of symbols associated with a second frequency band. The UE may transmit the second HARQ-ACK bit using a fourth quantity of symbols associated with the second frequency band. In some aspects, the second quantity of symbols may be less than the first quantity of symbols, and the fourth quantity of symbols may be less than the third quantity of symbols.

As shown by reference number 604, the UE may transmit the first HARQ-ACK using a first quantity of symbols. The UE may transmit the first HARQ-ACK bit and the second HARQ-ACK bit using a second quantity of symbols. The first quantity of symbols and the second quantity of symbols may be associated with a first frequency band. Further, the UE may transmit the first HARQ-ACK bit using a third quantity of symbols. The UE may transmit the first HARQ-ACK bit and the second HARQ-ACK bit using a fourth quantity of symbols. The third quantity of symbols and the fourth quantity of symbols may be associated with a second frequency band. In some aspects, the second quantity of symbols may be less than the first quantity of symbols, and the fourth quantity of symbols may be less than the third quantity of symbols.

As indicated above, FIG. 6 is provided as an example. Other examples may differ from what is described with regard to FIG. 6.

Figure 7:
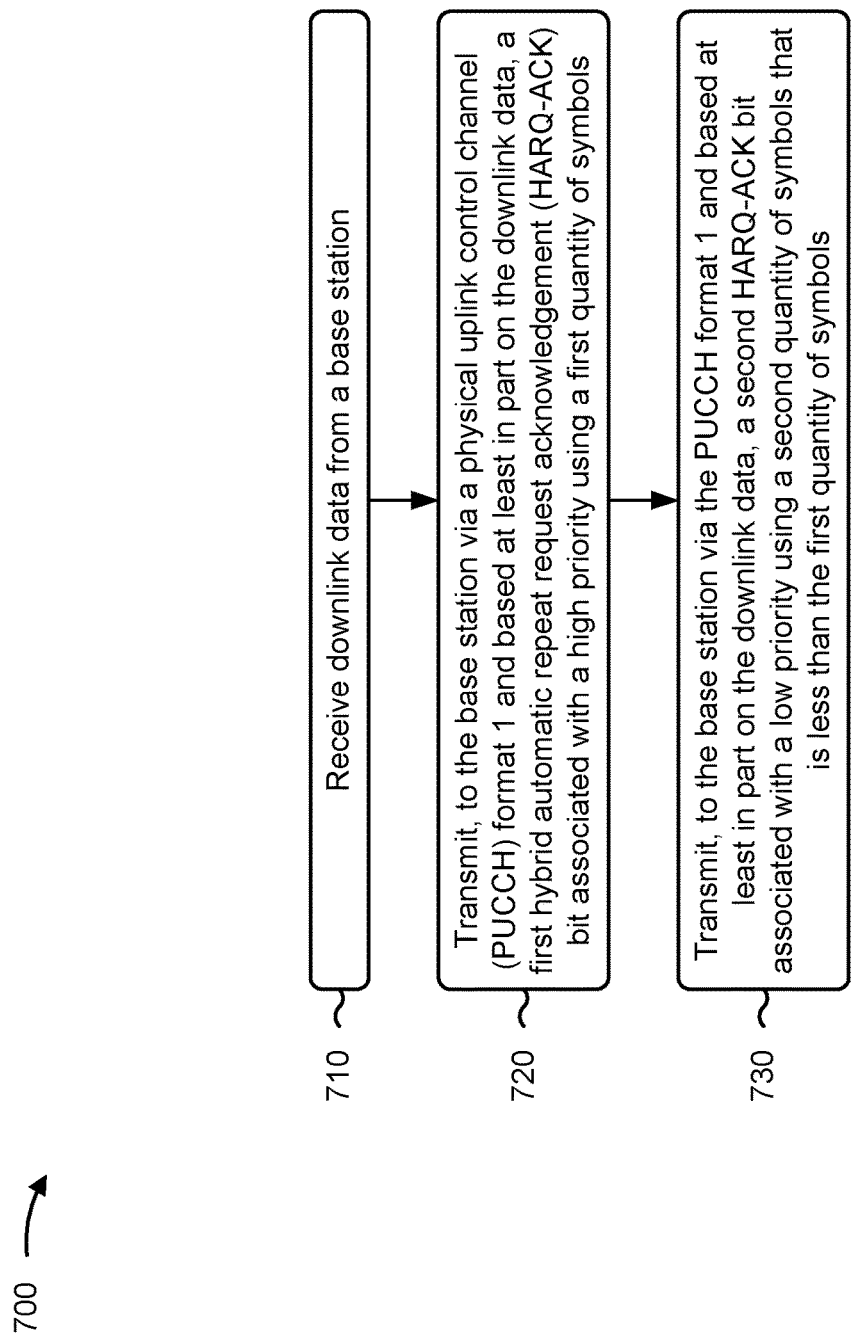
FIGS. 7-8 are diagrams illustrating example processes associated with priority-based HARQ-ACK feedback, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120) performs operations associated with priority-based HARQ-ACK feedback.

As shown in FIG. 7, in some aspects, process 700 may include receiving downlink data from a base station (block 710). For example, the UE (e.g., using reception component 902, depicted in FIG. 9) may receive downlink data from a base station, as described above.

As further shown in FIG. 7, in some aspects, process 700 may include transmitting, to the base station via a PUCCH format 1 and based at least in part on the downlink data, a first HARQ-ACK bit associated with a high priority using a first quantity of symbols (block 720). For example, the UE (e.g., using transmission component 904, depicted in FIG. 9) may transmit, to the base station via a PUCCH format 1 and based at least in part on the downlink data, a first HARQ-ACK bit associated with a high priority using a first quantity of symbols, as described above.

As further shown in FIG. 7, in some aspects, process 700 may include transmitting, to the base station via the PUCCH format 1 and based at least in part on the downlink data, a second HARQ-ACK bit associated with a low priority using a second quantity of symbols that is less than the first quantity of symbols (block 730). For example, the UE (e.g., using transmission component 904, depicted in FIG. 9) may transmit, to the base station via the PUCCH format 1 and based at least in part on the downlink data, a second HARQ-ACK bit associated with a low priority using a second quantity of symbols that is less than the first quantity of symbols, as described above.

Process 700 may include additional aspects, such as any single aspect or any combination of aspects described below and/or in connection with one or more other processes described elsewhere herein.

In a first aspect, transmitting the first HARQ-ACK bit and transmitting the second HARQ-ACK bit comprises transmitting HARQ-ACK feedback via the PUCCH format 1 based at least in part on a time division multiplexing of the first HARQ-ACK bit and the second HARQ-ACK bit.

In a second aspect, alone or in combination with the first aspect, transmitting the first HARQ-ACK bit comprises transmitting a repetition of the first HARQ-ACK bit using the first quantity of symbols, and transmitting the second HARQ-ACK bit comprises transmitting a repetition of the second HARQ-ACK bit using the second quantity of symbols, wherein a quantity of the repetition of the first HARQ-ACK bit is greater than a quantity of the repetition of the second HARQ-ACK bit to increase a reliability of the first HARQ-ACK bit in relation to the second HARQ-ACK bit.

In a third aspect, alone or in combination with one or more of the first and second aspects, process 700 includes receiving, from the base station via a radio resource control message, a parameter that defines one or more of the first quantity of symbols and the second quantity of symbols.

In a fourth aspect, alone or in combination with one or more of the first through third aspects, process 700 includes receiving, from the base station via downlink control information, a parameter that defines one or more of the first quantity of symbols and the second quantity of symbols.

In a fifth aspect, alone or in combination with one or more of the first through fourth aspects, transmitting the first HARQ-ACK bit and transmitting the second HARQ-ACK bit comprises transmitting the first HARQ-ACK bit earlier in time as compared to the second HARQ-ACK bit, and the first quantity of symbols occurs earlier in time as compared to the second quantity of symbols.

In a sixth aspect, alone or in combination with one or more of the first through fifth aspects, process 700 includes transmitting, to the base station via the PUCCH format 1 and based at least in part on the downlink data, both the first HARQ-ACK bit associated with the high priority and the second HARQ-ACK bit associated with the low priority using the second quantity of symbols.

In a seventh aspect, alone or in combination with one or more of the first through sixth aspects, transmitting the first HARQ-ACK bit comprises transmitting the first HARQ-ACK bit using the first quantity of symbols associated with a first frequency band and transmitting the first HARQ-ACK bit using a third quantity of symbols associated with a second frequency band, and transmitting the second HARQ-ACK bit comprises transmitting the second HARQ-ACK bit using the second quantity of symbols associated with the first frequency band and transmitting the second HARQ-ACK bit using a fourth quantity of symbols associated with the second frequency band, wherein the fourth quantity of symbols is less than the third quantity of symbols.

In an eighth aspect, alone or in combination with one or more of the first through seventh aspects, transmitting the first HARQ-ACK bit comprises transmitting the first HARQ-ACK bit using the first quantity of symbols and transmitting the first HARQ-ACK bit using the second quantity of symbols, wherein the first quantity of symbols and the second quantity of symbols are associated with a first frequency band, and transmitting the first HARQ-ACK bit using a third quantity of symbols and transmitting the first HARQ-ACK bit using a fourth quantity of symbols, wherein the third quantity of symbols and the fourth quantity of symbols are associated with a second frequency band, and wherein the fourth quantity of symbols is less than the third quantity of symbols, and transmitting the second HARQ-ACK bit comprises transmitting the second HARQ-ACK bit using the second quantity of symbols associated with the first frequency band and transmitting the second HARQ-ACK bit using the fourth quantity of symbols associated with the second frequency band.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
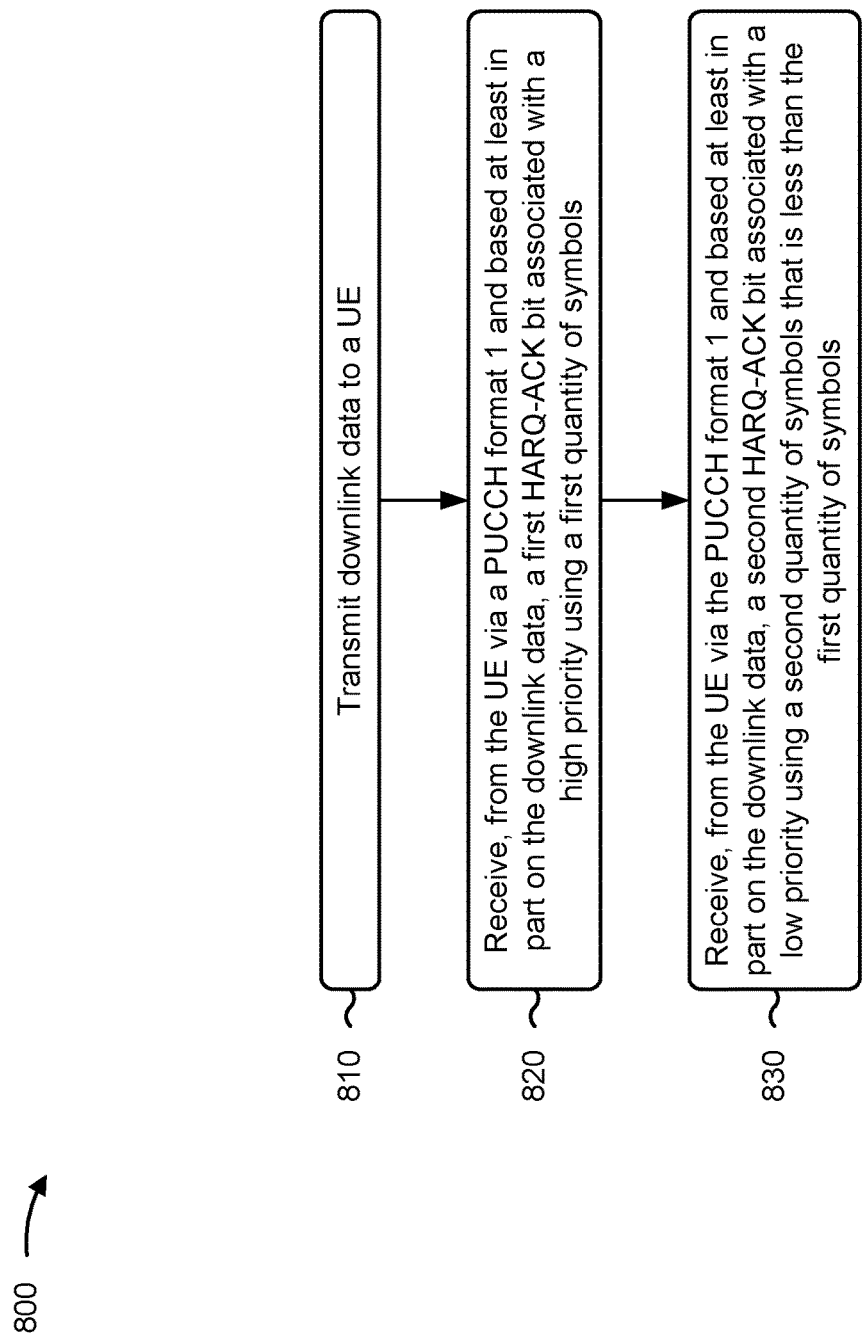

FIG. 8 is a diagram illustrating an example process 800 performed, for example, by a base station, in accordance with various aspects of the present disclosure. Example process 800 is an example where the base station (e.g., base station 110) performs operations associated with priority-based HARQ-ACK feedback.

As shown in FIG. 8, in some aspects, process 800 may include transmitting downlink data to a UE (block 810). For example, the base station (e.g., using transmission component 1004, depicted in FIG. 10) may transmit downlink data to a UE, as described above.

As further shown in FIG. 8, in some aspects, process 800 may include receiving, from the UE via a PUCCH format 1 and based at least in part on the downlink data, a first HARQ-ACK bit associated with a high priority using a first quantity of symbols (block 820). For example, the base station (e.g., using reception component 1002, depicted in FIG. 10) may receive, from the UE via a PUCCH format 1 and based at least in part on the downlink data, a first HARQ-ACK bit associated with a high priority using a first quantity of symbols, as described above.

As further shown in FIG. 8, in some aspects, process 800 may include receiving, from the UE via the PUCCH format 1 and based at least in part on the downlink data, a second HARQ-ACK bit associated with a low priority using a second quantity of symbols that is less than the first quantity of symbols (block 830). For example, the base station (e.g., using reception component 1002, depicted in FIG. 10) may receive, from the UE via the PUCCH format 1 and based at least in part on the downlink data, a second HARQ-ACK bit associated with a low priority using a second quantity of symbols that is less than the first quantity of symbols, as described above.

Process 800 may include additional aspects, such as any single aspect or any combination of aspects described below and/or in connection with one or more other processes described elsewhere herein.

In a first aspect, receiving the first HARQ-ACK bit and receiving the second HARQ-ACK bit comprises receiving HARQ-ACK feedback via the PUCCH format 1 based at least in part on a time division multiplexing of the first HARQ-ACK bit and the second HARQ-ACK bit.

In a second aspect, alone or in combination with the first aspect, receiving the first HARQ-ACK bit comprises receiving a repetition of the first HARQ-ACK bit using the first quantity of symbols, and receiving the second HARQ-ACK bit comprises receiving a repetition of the second HARQ-ACK bit using the second quantity of symbols, wherein a quantity of the repetition of the first HARQ-ACK bit is greater than a quantity of the repetition of the second HARQ-ACK bit to increase a reliability of the first HARQ-ACK bit in relation to the second HARQ-ACK bit.

In a third aspect, alone or in combination with one or more of the first and second aspects, process 800 includes transmitting, to the UE via a radio resource control message, a parameter that defines one or more of the first quantity of symbols and the second quantity of symbols.

In a fourth aspect, alone or in combination with one or more of the first through third aspects, process 800 includes transmitting, to the UE via downlink control information, a parameter that defines one or more of the first quantity of symbols and the second quantity of symbols.

In a fifth aspect, alone or in combination with one or more of the first through fourth aspects, receiving the first HARQ-ACK bit and receiving the second HARQ-ACK bit comprises receiving the first HARQ-ACK bit earlier in time as compared to the second HARQ-ACK bit, and the first quantity of symbols occurs earlier in time as compared to the second quantity of symbols.

In a sixth aspect, alone or in combination with one or more of the first through fifth aspects, process 800 includes receiving, from the UE via the PUCCH format 1 and based at least in part on the downlink data, both the first HARQ-ACK bit associated with the high priority and the second HARQ-ACK bit associated with the low priority using the second quantity of symbols.

In a seventh aspect, alone or in combination with one or more of the first through sixth aspects, receiving the first HARQ-ACK bit comprises receiving the first HARQ-ACK bit using the first quantity of symbols associated with a first frequency band, and receiving the first HARQ-ACK bit using a third quantity of symbols associated with a second frequency band, and receiving the second HARQ-ACK bit comprises receiving the second HARQ-ACK bit using the second quantity of symbols associated with the first frequency band and receiving the second HARQ-ACK bit using a fourth quantity of symbols associated with the second frequency band, wherein the fourth quantity of symbols is less than the third quantity of symbols.

In an eighth aspect, alone or in combination with one or more of the first through seventh aspects, receiving the first HARQ-ACK bit comprises receiving the first HARQ-ACK bit using the first quantity of symbols and receiving the first HARQ-ACK bit using the second quantity of symbols, wherein the first quantity of symbols and the second quantity of symbols are associated with a first frequency band, and receiving the first HARQ-ACK bit using a third quantity of symbols and receiving the first HARQ-ACK bit using a fourth quantity of symbols, wherein the third quantity of symbols and the fourth quantity of symbols are associated with a second frequency band, and wherein the fourth quantity of symbols is less than the third quantity of symbols, and receiving the second HARQ-ACK bit comprises receiving the second HARQ-ACK bit using the second quantity of symbols associated with the first frequency band and receiving the second HARQ-ACK bit using the fourth quantity of symbols associated with the second frequency band.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
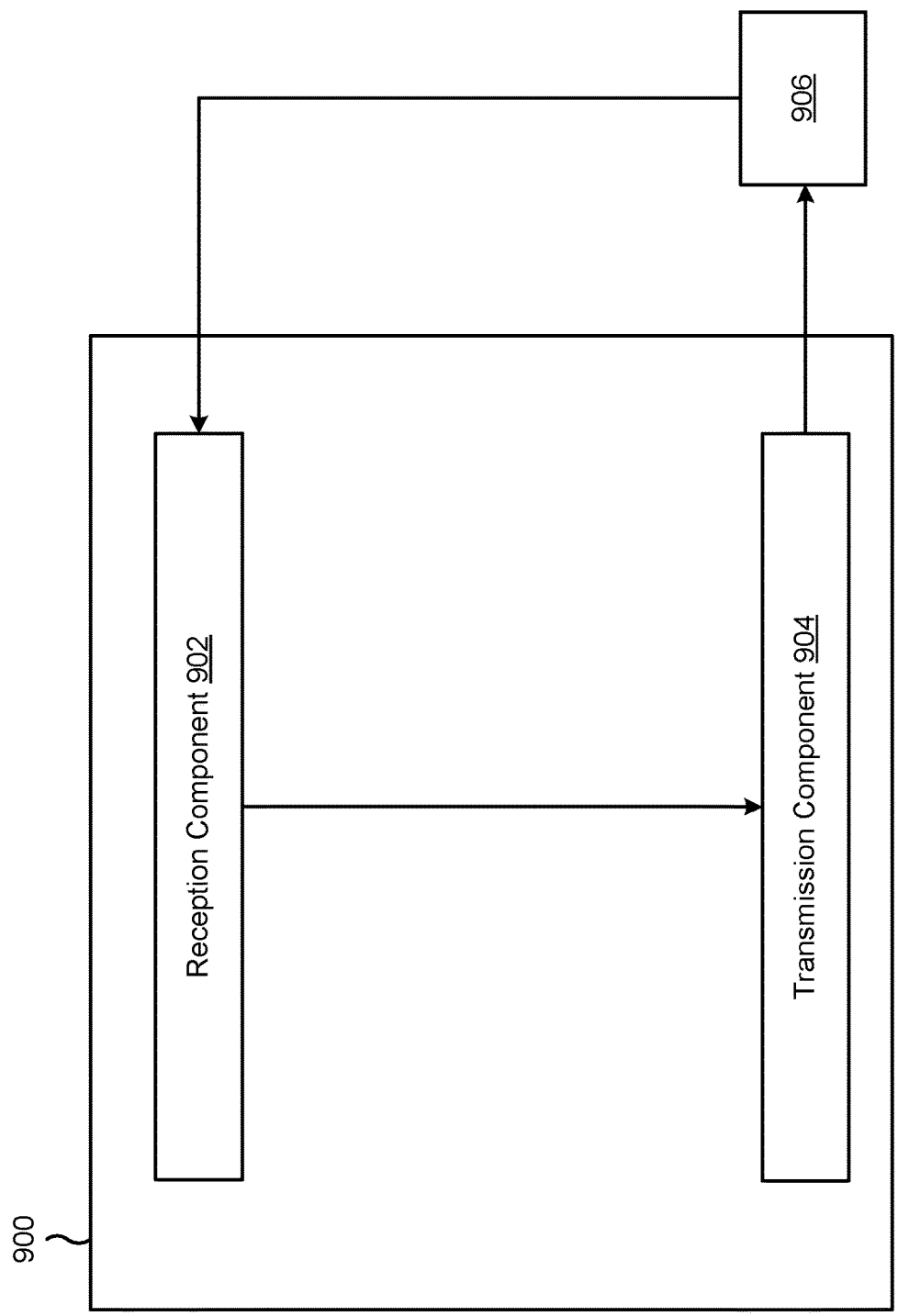
FIGS. 9-10 are block diagrams of example apparatuses for wireless communication, in accordance with various aspects of the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive downlink data from a base station. The transmission component 904 may transmit, to the base station via a PUCCH format 1 and based at least in part on the downlink data, a first HARQ-ACK bit associated with a high priority using a first quantity of symbols. The transmission component 904 may transmit, to the base station via the PUCCH format 1 and based at least in part on the downlink data, a second HARQ-ACK bit associated with a low priority using a second quantity of symbols that is less than the first quantity of symbols.

The transmission component 904 may transmit HARQ-ACK feedback via the PUCCH format 1 based at least in part on a time division multiplexing of the first HARQ-ACK bit and the second HARQ-ACK bit.

The transmission component 904 may transmit a repetition of the first HARQ-ACK bit using the first quantity of symbols and transmit a repetition of the second HARQ-ACK bit using the second quantity of symbols, wherein a quantity of the repetition of the first HARQ-ACK bit is greater than a quantity of the repetition of the second HARQ-ACK bit to increase a reliability of the first HARQ-ACK bit in relation to the second HARQ-ACK bit.

The reception component 902 may receive, from the base station via a radio resource control message, a parameter that defines one or more of the first quantity of symbols and the second quantity of symbols.

The reception component 902 may receive, from the base station via downlink control information, a parameter that defines one or more of the first quantity of symbols and the second quantity of symbols.

The transmission component 904 may transmit the first HARQ-ACK bit earlier in time as compared to the second HARQ-ACK bit, wherein the first quantity of symbols occurs earlier in time as compared to the second quantity of symbols.

The transmission component 904 may transmit, to the base station via the PUCCH format 1 and based at least in part on the downlink data, both the first HARQ-ACK bit associated with the high priority and the second HARQ-ACK bit associated with the low priority using the second quantity of symbols.

The transmission component 904 may transmit the first HARQ-ACK bit using the first quantity of symbols associated with a first frequency band and transmit the first HARQ-ACK bit using a third quantity of symbols associated with a second frequency band. The transmission component 904 may transmit the second HARQ-ACK bit using the second quantity of symbols associated with the first frequency band and transmit the second HARQ-ACK bit using a fourth quantity of symbols associated with the second frequency band, wherein the fourth quantity of symbols is less than the third quantity of symbols.

The transmission component 904 may transmit the first HARQ-ACK bit using the first quantity of symbols and transmit the first HARQ-ACK bit using the second quantity of symbols, wherein the first quantity of symbols and the second quantity of symbols are associated with a first frequency band. The transmission component 904 may transmit the first HARQ-ACK bit using a third quantity of symbols and transmit the first HARQ-ACK bit using a fourth quantity of symbols, wherein the third quantity of symbols and the fourth quantity of symbols are associated with a second frequency band, and wherein the fourth quantity of symbols is less than the third quantity of symbols. The transmission component 904 may transmit the second HARQ-ACK bit using the second quantity of symbols associated with the first frequency band and transmit the second HARQ-ACK bit using the fourth quantity of symbols associated with the second frequency band.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
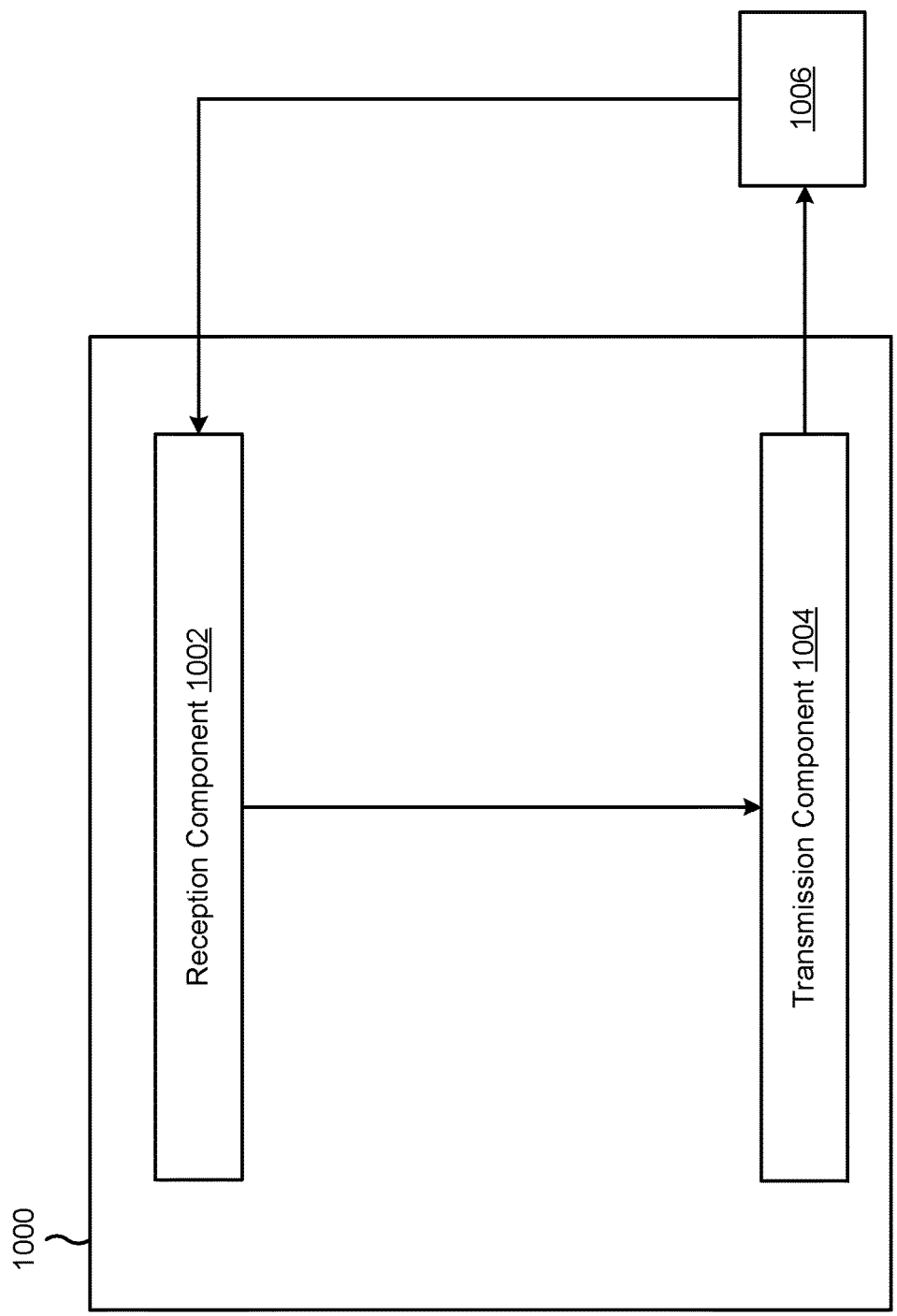

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit downlink data to a UE. The reception component 1002 may receive, from the UE via a PUCCH format 1 and based at least in part on the downlink data, a first HARQ-ACK bit associated with a high priority using a first quantity of symbols. The reception component 1002 may receive, from the UE via the PUCCH format 1 and based at least in part on the downlink data, a second HARQ-ACK bit associated with a low priority using a second quantity of symbols that is less than the first quantity of symbols.

The reception component 1002 may receive HARQ-ACK feedback via the PUCCH format 1 based at least in part on a time division multiplexing of the first HARQ-ACK bit and the second HARQ-ACK bit.

The reception component 1002 may receive a repetition of the first HARQ-ACK bit using the first quantity of symbols and receive a repetition of the second HARQ-ACK bit using the second quantity of symbols, wherein a quantity of the repetition of the first HARQ-ACK bit is greater than a quantity of the repetition of the second HARQ-ACK bit to increase a reliability of the first HARQ-ACK bit in relation to the second HARQ-ACK bit.

The transmission component 1004 may transmit, to the UE via a radio resource control message, a parameter that defines one or more of the first quantity of symbols and the second quantity of symbols.

The transmission component 1004 may transmit, to the UE via downlink control information, a parameter that defines one or more of the first quantity of symbols and the second quantity of symbols.

The reception component 1002 may receive the first HARQ-ACK bit earlier in time as compared to the second HARQ-ACK bit, wherein the first quantity of symbols occurs earlier in time as compared to the second quantity of symbols.

The reception component 1002 may receive, from the UE via the PUCCH format 1 and based at least in part on the downlink data, both the first HARQ-ACK bit associated with the high priority and the second HARQ-ACK bit associated with the low priority using the second quantity of symbols.

The reception component 1002 may receive the first HARQ-ACK bit using the first quantity of symbols associated with a first frequency band and receive the first HARQ-ACK bit using a third quantity of symbols associated with a second frequency band. The reception component 1002 may receive the second HARQ-ACK bit using the second quantity of symbols associated with the first frequency band and receive the second HARQ-ACK bit using a fourth quantity of symbols associated with the second frequency band, wherein the fourth quantity of symbols is less than the third quantity of symbols.

The reception component 1002 may receive the first HARQ-ACK bit using the first quantity of symbols and receive the first HARQ-ACK bit using the second quantity of symbols, wherein the first quantity of symbols and the second quantity of symbols are associated with a first frequency band. The reception component 1002 may receive the first HARQ-ACK bit using a third quantity of symbols and receive the first HARQ-ACK bit using a fourth quantity of symbols, wherein the third quantity of symbols and the fourth quantity of symbols are associated with a second frequency band, and wherein the fourth quantity of symbols is less than the third quantity of symbols. The reception component 1002 may receive the second HARQ-ACK bit using the second quantity of symbols associated with the first frequency band and receive the second HARQ-ACK bit using the fourth quantity of symbols associated with the second frequency band.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of aspects of the present disclosure:

Aspect 1: A method of wireless communication performed by a user equipment (UE), comprising: receiving downlink data from a base station; transmitting, to the base station via a physical uplink control channel (PUCCH) format 1 and based at least in part on the downlink data, a first hybrid automatic repeat request acknowledgement (HARQ-ACK) bit associated with a high priority using a first quantity of symbols; and transmitting, to the base station via the PUCCH format 1 and based at least in part on the downlink data, a second HARQ-ACK bit associated with a low priority using a second quantity of symbols that is less than the first quantity of symbols.

Aspect 2: The method of aspect 1, wherein transmitting the first HARQ-ACK bit and transmitting the second HARQ-ACK bit comprises transmitting HARQ-ACK feedback via the PUCCH format 1 based at least in part on a time division multiplexing of the first HARQ-ACK bit and the second HARQ-ACK bit.

Aspect 3: The method of any of aspects 1 through 2, wherein: transmitting the first HARQ-ACK bit comprises transmitting a repetition of the first HARQ-ACK bit using the first quantity of symbols; and transmitting the second HARQ-ACK bit comprises transmitting a repetition of the second HARQ-ACK bit using the second quantity of symbols, wherein a quantity of the repetition of the first HARQ-ACK bit is greater than a quantity of the repetition of the second HARQ-ACK bit to increase a reliability of the first HARQ-ACK bit in relation to the second HARQ-ACK bit.

Aspect 4: The method of any of aspects 1 through 3, further comprising: receiving, from the base station via a radio resource control message, a parameter that defines one or more of the first quantity of symbols and the second quantity of symbols.

Aspect 5: The method of any of aspects 1 through 4, further comprising: receiving, from the base station via downlink control information, a parameter that defines one or more of the first quantity of symbols and the second quantity of symbols.

Aspect 6: The method of any of aspects 1 through 5, wherein transmitting the first HARQ-ACK bit and transmitting the second HARQ-ACK bit comprises transmitting the first HARQ-ACK bit earlier in time as compared to the second HARQ-ACK bit, and wherein the first quantity of symbols occurs earlier in time as compared to the second quantity of symbols.

Aspect 7: The method of any of aspects 1 through 6, further comprising: transmitting, to the base station via the PUCCH format 1 and based at least in part on the downlink data, both the first HARQ-ACK bit associated with the high priority and the second HARQ-ACK bit associated with the low priority using the second quantity of symbols.

Aspect 8: The method of any of aspects 1 through 7, wherein transmitting the first HARQ-ACK bit comprises: transmitting the first HARQ-ACK bit using the first quantity of symbols associated with a first frequency band; and transmitting the first HARQ-ACK bit using a third quantity of symbols associated with a second frequency band; and transmitting the second HARQ-ACK bit comprises: transmitting the second HARQ-ACK bit using the second quantity of symbols associated with the first frequency band; and transmitting the second HARQ-ACK bit using a fourth quantity of symbols associated with the second frequency band, wherein the fourth quantity of symbols is less than the third quantity of symbols.

Aspect 9: The method of any of aspects 1 through 8, wherein transmitting the first HARQ-ACK bit comprises: transmitting the first HARQ-ACK bit using the first quantity of symbols and transmitting the first HARQ-ACK bit using the second quantity of symbols, wherein the first quantity of symbols and the second quantity of symbols are associated with a first frequency band; and transmitting the first HARQ-ACK bit using a third quantity of symbols and transmitting the first HARQ-ACK bit using a fourth quantity of symbols, wherein the third quantity of symbols and the fourth quantity of symbols are associated with a second frequency band, and wherein the fourth quantity of symbols is less than the third quantity of symbols; and transmitting the second HARQ-ACK bit comprises: transmitting the second HARQ-ACK bit using the second quantity of symbols associated with the first frequency band and transmitting the second HARQ-ACK bit using the fourth quantity of symbols associated with the second frequency band.

Aspect 10: A method of wireless communication performed by a base station, comprising: transmitting downlink data to a user equipment (UE); receiving, from the UE via a physical uplink control channel (PUCCH) format 1 and based at least in part on the downlink data, a first hybrid automatic repeat request acknowledgement (HARQ-ACK) bit associated with a high priority using a first quantity of symbols; and receiving, from the UE via the PUCCH format 1 and based at least in part on the downlink data, a second HARQ-ACK bit associated with a low priority using a second quantity of symbols that is less than the first quantity of symbols.

Aspect 11: The method of aspect 10, wherein receiving the first HARQ-ACK bit and receiving the second HARQ-ACK bit comprises receiving HARQ-ACK feedback via the PUCCH format 1 based at least in part on a time division multiplexing of the first HARQ-ACK bit and the second HARQ-ACK bit.

Aspect 12: The method of any of aspects 10 through 11, wherein: receiving the first HARQ-ACK bit comprises receiving a repetition of the first HARQ-ACK bit using the first quantity of symbols; and receiving the second HARQ-ACK bit comprises receiving a repetition of the second HARQ-ACK bit using the second quantity of symbols, wherein a quantity of the repetition of the first HARQ-ACK bit is greater than a quantity of the repetition of the second HARQ-ACK bit to increase a reliability of the first HARQ-ACK bit in relation to the second HARQ-ACK bit.

Aspect 13: The method of any of aspects 10 through 12, further comprising: transmitting, to the UE via a radio resource control message, a parameter that defines one or more of the first quantity of symbols and the second quantity of symbols.

Aspect 14: The method of any of aspects 10 through 13, further comprising: transmitting, to the UE via downlink control information, a parameter that defines one or more of the first quantity of symbols and the second quantity of symbols.

Aspect 15: The method of any of aspects 10 through 14, wherein receiving the first HARQ-ACK bit and receiving the second HARQ-ACK bit comprises receiving the first HARQ-ACK bit earlier in time as compared to the second HARQ-ACK bit, and wherein the first quantity of symbols occurs earlier in time as compared to the second quantity of symbols.

Aspect 16: The method of any of aspects 10 through 15, further comprising: receiving, from the UE via the PUCCH format 1 and based at least in part on the downlink data, both the first HARQ-ACK bit associated with the high priority and the second HARQ-ACK bit associated with the low priority using the second quantity of symbols.

Aspect 17: The method of any of aspects 10 through 16, wherein receiving the first HARQ-ACK bit comprises: receiving the first HARQ-ACK bit using the first quantity of symbols associated with a first frequency band; and receiving the first HARQ-ACK bit using a third quantity of symbols associated with a second frequency band; and receiving the second HARQ-ACK bit comprises: receiving the second HARQ-ACK bit using the second quantity of symbols associated with the first frequency band; and receiving the second HARQ-ACK bit using a fourth quantity of symbols associated with the second frequency band, wherein the fourth quantity of symbols is less than the third quantity of symbols.

Aspect 18: The method of any of aspects 10 through 17, wherein receiving the first HARQ-ACK bit comprises: receiving the first HARQ-ACK bit using the first quantity of symbols and receiving the first HARQ-ACK bit using the second quantity of symbols, wherein the first quantity of symbols and the second quantity of symbols are associated with a first frequency band; and receiving the first HARQ-ACK bit using a third quantity of symbols and receiving the first HARQ-ACK bit using a fourth quantity of symbols, wherein the third quantity of symbols and the fourth quantity of symbols are associated with a second frequency band, and wherein the fourth quantity of symbols is less than the third quantity of symbols; and receiving the second HARQ-ACK bit comprises: receiving the second HARQ-ACK bit using the second quantity of symbols associated with the first frequency band and receiving the second HARQ-ACK bit using the fourth quantity of symbols associated with the second frequency band.

Aspect 19: An apparatus for wireless communication at a device, comprising a processor; memory coupled with the processor; and instructions stored in the memory and executable by the processor to cause the apparatus to perform the method of one or more aspects of aspects 1-9.

Aspect 20: A device for wireless communication, comprising a memory and one or more processors coupled to the memory, the memory and the one or more processors configured to perform the method of one or more aspects of aspects 1-9.

Aspect 21: An apparatus for wireless communication, comprising at least one means for performing the method of one or more aspects of aspects 1-9.

Aspect 22: A non-transitory computer-readable medium storing code for wireless communication, the code comprising instructions executable by a processor to perform the method of one or more aspects of aspects 1-9.

Aspect 23: A non-transitory computer-readable medium storing a set of instructions for wireless communication, the set of instructions comprising one or more instructions that, when executed by one or more processors of a device, cause the device to perform the method of one or more aspects of aspects 1-9.

Aspect 24: An apparatus for wireless communication at a device, comprising a processor; memory coupled with the processor; and instructions stored in the memory and executable by the processor to cause the apparatus to perform the method of one or more aspects of aspects 10-18.

Aspect 25: A device for wireless communication, comprising a memory and one or more processors coupled to the memory, the memory and the one or more processors configured to perform the method of one or more aspects of aspects 10-18.

Aspect 26: An apparatus for wireless communication, comprising at least one means for performing the method of one or more aspects of aspects 10-18.

Aspect 27: A non-transitory computer-readable medium storing code for wireless communication, the code comprising instructions executable by a processor to perform the method of one or more aspects of aspects 10-18.

Aspect 28: A non-transitory computer-readable medium storing a set of instructions for wireless communication, the set of instructions comprising one or more instructions that, when executed by one or more processors of a device, cause the device to perform the method of one or more aspects of aspects 10-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving downlink data from a base station;
   transmitting, to the base station via a physical uplink control channel (PUCCH) format 1 and based at least in part on the downlink data, a first hybrid automatic repeat request acknowledgement (HARQ-ACK) bit associated with a high priority using a first quantity of symbols, wherein transmitting the first HARQ-ACK bit comprises transmitting one or more repetitions of the first HARQ-ACK bit using the first quantity of symbols; and
   transmitting, to the base station via the PUCCH format 1 and based at least in part on the downlink data, a second HARQ-ACK bit associated with a low priority using a second quantity of symbols that is less than the first quantity of symbols, wherein transmitting the second HARQ-ACK bit comprises transmitting one or more repetitions of the second HARQ-ACK bit using the second quantity of symbols.

2. The method of claim 1, wherein transmitting the first HARQ-ACK bit and transmitting the second HARQ-ACK bit comprises transmitting HARQ-ACK feedback via the PUCCH format 1 based at least in part on a time division multiplexing of the first HARQ-ACK bit and the second HARQ-ACK bit.

3. The method of claim 1,
   wherein a quantity of the one or more repetitions of the first HARQ-ACK bit is greater than a quantity of the one or more repetitions of the second HARQ-ACK bit to increase a reliability of the first HARQ-ACK bit in relation to the second HARQ-ACK bit.

4. The method of claim 1, further comprising:
   receiving, from the base station via a radio resource control message, a parameter that defines one or more of the first quantity of symbols and the second quantity of symbols.

5. The method of claim 1, further comprising:
   receiving, from the base station via downlink control information, a parameter that defines one or more of the first quantity of symbols and the second quantity of symbols.

6. The method of claim 1, wherein transmitting the first HARQ-ACK bit and transmitting the second HARQ-ACK bit comprises transmitting the first HARQ-ACK bit earlier in time as compared to the second HARQ-ACK bit, and wherein the first quantity of symbols occurs earlier in time as compared to the second quantity of symbols.

7. The method of claim 1, further comprising:
   transmitting, to the base station via the PUCCH format 1 and based at least in part on the downlink data, both the first HARQ-ACK bit associated with the high priority and the second HARQ-ACK bit associated with the low priority using the second quantity of symbols.

8. The method of claim 1, wherein
   transmitting the first HARQ-ACK bit comprises:
      transmitting the first HARQ-ACK bit using the first quantity of symbols associated with a first frequency band; and
      transmitting the first HARQ-ACK bit using a third quantity of symbols associated with a second frequency band; and
   transmitting the second HARQ-ACK bit comprises:
      transmitting the second HARQ-ACK bit using the second quantity of symbols associated with the first frequency band; and
      transmitting the second HARQ-ACK bit using a fourth quantity of symbols associated with the second frequency band, wherein the fourth quantity of symbols is less than the third quantity of symbols.

9. The method of claim 1, wherein
   transmitting the first HARQ-ACK bit comprises:
      transmitting the first HARQ-ACK bit using the first quantity of symbols and transmitting the first HARQ-ACK bit using the second quantity of symbols, wherein the first quantity of symbols and the second quantity of symbols are associated with a first frequency band; and transmitting the first HARQ-ACK bit using a third quantity of symbols and transmitting the first HARQ-ACK bit using a fourth quantity of symbols, wherein the third quantity of symbols and the fourth quantity of symbols are associated with a second frequency band, and wherein the fourth quantity of symbols is less than the third quantity of symbols; and transmitting the second HARQ-ACK bit comprises:
transmitting the second HARQ-ACK bit using the second quantity of symbols associated with the first frequency band and transmitting the second HARQ-ACK bit using the fourth quantity of symbols associated with the second frequency band.

10. A method of wireless communication performed by a base station, comprising:

transmitting downlink data to a user equipment (UE);
receiving, from the UE via a physical uplink control channel (PUCCH) format 1 and based at least in part on the downlink data, a first hybrid automatic repeat request acknowledgement (HARQ-ACK) bit associated with a high priority using a first quantity of symbols, wherein receiving the first HARQ-ACK bit comprises receiving one or more repetitions of the first HARQ-ACK bit using the first quantity of symbols; and receiving, from the UE via the PUCCH format 1 and based at least in part on the downlink data, a second HARQ-ACK bit associated with a low priority using a second quantity of symbols that is less than the first quantity of symbols, wherein receiving the second HARQ-ACK bit comprises receiving one or more repetitions of the second HARQ-ACK bit using the second quantity of symbols.

11. The method of claim 10, wherein receiving the first HARQ-ACK bit and receiving the second HARQ-ACK bit comprises receiving HARQ-ACK feedback via the PUCCH format 1 based at least in part on a time division multiplexing of the first HARQ-ACK bit and the second HARQ-ACK bit.

12. The method of claim 10,
wherein a quantity of the one or more repetitions of the first HARQ-ACK bit is greater than a quantity of the one or more repetitions of the second HARQ-ACK bit to increase a reliability of the first HARQ-ACK bit in relation to the second HARQ-ACK bit.

13. The method of claim 10, further comprising:
transmitting, to the UE via a radio resource control message, a parameter that defines one or more of the first quantity of symbols and the second quantity of symbols.

14. The method of claim 10, further comprising:
transmitting, to the UE via downlink control information, a parameter that defines one or more of the first quantity of symbols and the second quantity of symbols.

15. The method of claim 10, wherein receiving the first HARQ-ACK bit and receiving the second HARQ-ACK bit comprises receiving the first HARQ-ACK bit earlier in time as compared to the second HARQ-ACK bit, and wherein the first quantity of symbols occurs earlier in time as compared to the second quantity of symbols.

16. The method of claim 10, further comprising:
receiving, from the UE via the PUCCH format 1 and based at least in part on the downlink data, both the first HARQ-ACK bit associated with the high priority and the second HARQ-ACK bit associated with the low priority using the second quantity of symbols.

17. The method of claim 10, wherein
receiving the first HARQ-ACK bit comprises:
receiving the first HARQ-ACK bit using the first quantity of symbols associated with a first frequency band; and
receiving the first HARQ-ACK bit using a third quantity of symbols associated with a second frequency band; and
receiving the second HARQ-ACK bit comprises:
receiving the second HARQ-ACK bit using the second quantity of symbols associated with the first frequency band; and
receiving the second HARQ-ACK bit using a fourth quantity of symbols associated with the second frequency band, wherein the fourth quantity of symbols is less than the third quantity of symbols.

18. The method of claim 10, wherein
receiving the first HARQ-ACK bit comprises:
receiving the first HARQ-ACK bit using the first quantity of symbols and receiving the first HARQ-ACK bit using the second quantity of symbols, wherein the first quantity of symbols and the second quantity of symbols are associated with a first frequency band; and
receiving the first HARQ-ACK bit using a third quantity of symbols and receiving the first HARQ-ACK bit using a fourth quantity of symbols, wherein the third quantity of symbols and the fourth quantity of symbols are associated with a second frequency band, and wherein the fourth quantity of symbols is less than the third quantity of symbols; and receiving the second HARQ-ACK bit comprises:
receiving the second HARQ-ACK bit using the second quantity of symbols associated with the first frequency band and receiving the second HARQ-ACK bit using the fourth quantity of symbols associated with the second frequency band.

19. A user equipment (UE) for wireless communication, comprising:

a memory; and
one or more processors operatively coupled to the memory, the memory and the one or more processors configured to:
receive downlink data from a base station;
transmit, to the base station via a physical uplink control channel (PUCCH) format 1 and based at least in part on the downlink data, a first hybrid automatic repeat request acknowledgement (HARQ-ACK) bit associated with a high priority using a first quantity of symbols, wherein transmitting the first HARQ-ACK bit comprises transmitting one or more repetitions of the first HARQ-ACK bit using the first quantity of symbols; and
transmit, to the base station via the PUCCH format 1 and based at least in part on the downlink data, a second HARQ-ACK bit associated with a low priority using a second quantity of symbols that is less than the first quantity of symbols, wherein transmitting the second HARQ-ACK bit comprises transmitting one or more repetitions of the second HARQ-ACK bit using the second quantity of symbols.

20. The UE of claim 19, wherein the one or more processors, when transmitting the first HARQ-ACK bit and transmitting the second HARQ-ACK bit, are configured to transmit HARQ-ACK feedback via the PUCCH format 1 based at least in part on a time division multiplexing of the first HARQ-ACK bit and the second HARQ-ACK bit.

21. The UE of claim 19,
wherein a quantity of the one or more repetitions of the first HARQ-ACK bit is greater than a quantity of the one or more repetitions of the second HARQ-ACK bit to increase a reliability of the first HARQ-ACK bit in relation to the second HARQ-ACK bit.

22. The UE of claim 19, wherein the one or more processors are further configured to:
receive, from the base station via a radio resource control message, a parameter that defines one or more of the first quantity of symbols and the second quantity of symbols.

23. The UE of claim 19, wherein the one or more processors are further configured to:
receive, from the base station via downlink control information, a parameter that defines one or more of the first quantity of symbols and the second quantity of symbols.

24. The UE of claim 19, wherein the one or more processors, when transmitting the first HARQ-ACK bit and transmitting the second HARQ-ACK bit, are configured to transmit the first HARQ-ACK bit earlier in time as compared to the second HARQ-ACK bit, and wherein the first quantity of symbols occurs earlier in time as compared to the second quantity of symbols.

25. A base station for wireless communication, comprising:
a memory; and
one or more processors operatively coupled to the memory, the memory and the one or more processors configured to:
transmit downlink data to a user equipment (UE);
receive, from the UE via a physical uplink control channel (PUCCH) format 1 and based at least in part on the downlink data, a first hybrid automatic repeat request acknowledgement (HARQ-ACK) bit associated with a high priority using a first quantity of symbols, wherein receiving the first HARQ-ACK bit comprises receiving one or more repetitions of the first HARQ-ACK bit using the first quantity of symbols; and
receive, from the UE via the PUCCH format 1 and based at least in part on the downlink data, a second HARQ-ACK bit associated with a low priority using a second quantity of symbols that is less than the first quantity of symbols, wherein receiving the second HARQ-ACK bit comprises receiving one or more repetitions of the second HARQ-ACK bit using the second quantity of symbols.

26. The base station of claim 25, wherein the one or more processors, when receiving the first HARQ-ACK bit and receiving the second HARQ-ACK bit, are configured to receive HARQ-ACK feedback via the PUCCH format 1 based at least in part on a time division multiplexing of the first HARQ-ACK bit and the second HARQ-ACK bit.

27. The base station of claim 25,
wherein a quantity of the one or more repetitions of the first HARQ-ACK bit is greater than a quantity of the one or more repetitions of the second HARQ-ACK bit to increase a reliability of the first HARQ-ACK bit in relation to the second HARQ-ACK bit.

28. The base station of claim 25, wherein the one or more processors are further configured to:
transmit, to the UE via a radio resource control message, a parameter that defines one or more of the first quantity of symbols and the second quantity of symbols.

29. The base station of claim 25, wherein the one or more processors are further configured to:
transmit, to the UE via downlink control information, a parameter that defines one or more of the first quantity of symbols and the second quantity of symbols.

30. The base station of claim 25, wherein the one or more processors, when receiving the first HARQ-ACK bit and receiving the second HARQ-ACK bit, are configured to receive the first HARQ-ACK bit earlier in time as compared to the second HARQ-ACK bit, and wherein the first quantity of symbols occurs earlier in time as compared to the second quantity of symbols.

* * * * *